(12) United States Patent
Luft et al.

(10) Patent No.: US 11,706,053 B2
(45) Date of Patent: Jul. 18, 2023

(54) DIFFERENTIAL LATENCY MEASUREMENT

(71) Applicant: IPCom GmbH & Co. KG, Pullach (DE)

(72) Inventors: Achim Luft, Braunschweig (DE); Maik Bienas, Schöppenstedt (DE); Martin Hans, Bad Salzdetfurth (DE); Andreas Schmidt, Braunschweig (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

(21) Appl. No.: 17/292,453

(22) PCT Filed: Nov. 29, 2019

(86) PCT No.: PCT/EP2019/083095
§ 371 (c)(1),
(2) Date: May 10, 2021

(87) PCT Pub. No.: WO2020/109555
PCT Pub. Date: Jun. 4, 2020

(65) Prior Publication Data
US 2021/0351997 A1 Nov. 11, 2021

(30) Foreign Application Priority Data
Nov. 30, 2018 (EP) ..................... 18209415

(51) Int. Cl.
*H04L 12/54* (2022.01)
*H04L 43/067* (2022.01)
*H04L 43/0817* (2022.01)
*H04L 43/0852* (2022.01)
*H04L 43/16* (2022.01)
*H04W 36/00* (2009.01)
*H04L 45/121* (2022.01)

(52) U.S. Cl.
CPC ........ *H04L 12/5691* (2013.01); *H04L 43/067* (2013.01); *H04L 43/0817* (2013.01); *H04L 43/0858* (2013.01); *H04L 43/16* (2013.01); *H04L 45/121* (2013.01); *H04W 36/0016* (2013.01)

(58) Field of Classification Search
CPC ....... H04L 45/70; H04L 45/22; H04L 45/121; H04L 43/16; H04L 43/0858; H04L 47/34; H04L 12/5691; H04L 41/0659; G06F 13/20; H04W 36/0016; H04W 36/18
See application file for complete search history.

(56) References Cited

U.S. PATENT DOCUMENTS

2014/0068106 A1* 3/2014 Turlington .......... H04L 12/5691
709/241
2018/0098250 A1* 4/2018 Vrzic ................ H04W 36/0016
2018/0123923 A1* 5/2018 Zhou ..................... H04L 45/121

* cited by examiner

*Primary Examiner* — Kyung H Shin
(74) *Attorney, Agent, or Firm* — PROI Intellectual Property US; Klaus Michael Schmid (57) ABSTRACT

The present invention provides a method of selecting an optimal communication routing between a UE and a core network wherein a plurality of differing communication paths are establishable between the UE and the network. Duplicate packets are transmitted over two communication paths and a latency difference determined between the two paths. This latency difference is used to select a communication path for subsequent communication.

20 Claims, 7 Drawing Sheets

DIFFERENTIAL LATENCY MEASUREMENT

The present invention relates to obtaining a measurement of a latency difference between two distinct communication paths.

Within the framework of 5G standardization 3GPP has divided use cases into three categories: Enhanced Mobile Broadband (eMBB), massive internet-of-things (mIoT), and ultra reliable and low latency communication (URLLC). In order to increase the reliability of LTE and 5G transmission, 3GPP specified in REL-14 a mechanism called "packet duplication". This mechanism duplicates packets in PDCP layer and transfers these redundant packets to one or more MAC layer for transmission over different respective physical media. On the receiver side after successful reception of a PDU, the PDCP layer discards redundant PDUs. Packet duplication is enabled in PDCP layer depending on the reliability demand of a service, the link quality, latency or PDCP queue filling level.

Figure 1:
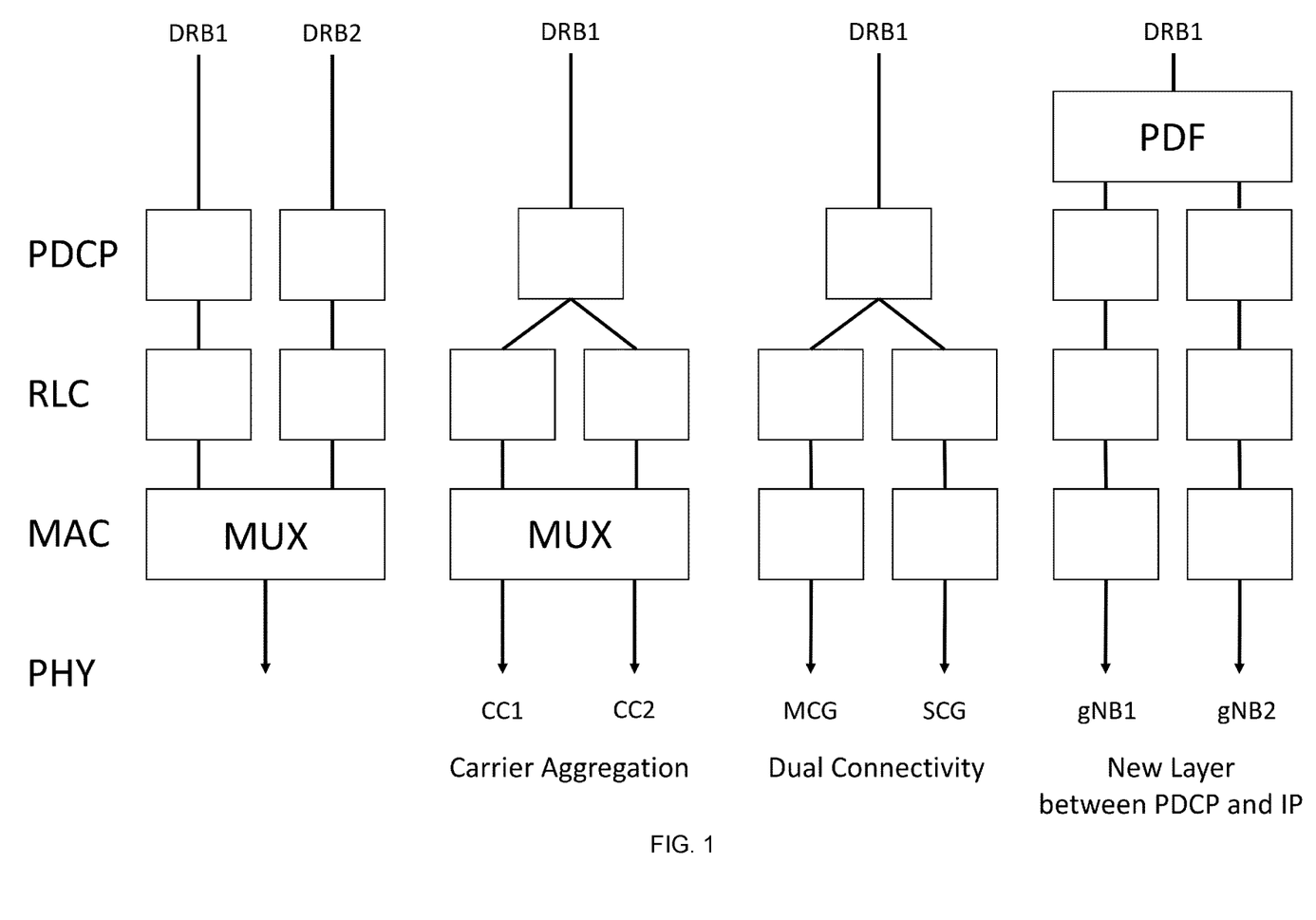
FIG. 1 shows possible packet duplication schemes.

Packet duplication can be activated within the same MAC layer but different multiplexing (mode 1 in FIG. 1) or different carriers and carrier aggregation (mode 2 in FIG. 1). In this case the redundant packets are multiplexed by one MAC entity to different physical media, e.g. subcarriers on both sides of the same carrier or with carrier aggregation to different carriers. The redundant packets can also be sent to two different instances of the MAC layer (mode 3 in FIG. 1). In case of dual connectivity, there are two instances of the MAC layer, each linked to a different cell. One is the master cell and the other the secondary cell. In this case the duplicated packets are sent via two different cells; meaning two different radio paths, if the related cells are located at different locations. The different packet duplication modes are illustrated in FIG. 1.

To enable packet duplication a new reporting function has been added to PDCP. Especially the filling level of the PDCP queue is reported to lower layers, e.g. MAC layer, or to the peer PDCP at the receiver.

One significant value for determining the quality-of-service (QoS) of a communication link is latency. Latency is the required duration to transfer a signal via a communication channel from a transmitter to a receiver. Latency is named end-to-end latency if the considered channel is from the original sender to the dedicated receiver of the signal. In order to determine and control QoS, latency measurements have to be performed. This is currently done by injected probe packets or by adding timing information to data packets. Another option is in-band round-trip time measurements, where a timer in a routing network element measures the duration from a passthrough packet to the arrival of a respective acknowledgment of the packet from the receiver.

Usually in packet switched networks a data packet can be routed thru several feasible switching paths between network elements. Mechanisms to determine the optimal path compare the number of involved network elements (hop counter), current throughput of network elements, latency between hops, end-to-end latency, and much more. The optimal switching path is not static, since mentioned values are not static either and network load and availability of network elements varies over time. This is valid especially for radio communication. Compared to wired connections, QoS affecting channel properties will frequently vary over time, even for short range radio channels and for fixed transceivers.

In future heterogeneous networks involving a high number of small-cells per connection using a multi-hop wireless backhaul, packet transmission delay becomes a significant parameter. On the other hand, this new architecture variant allows for redundant data transfer to increase transmission reliability and reduce latency or jitter, where possible. Assuming dual connectivity (DC) deployment over multiple small cells or over a single macro and one or more small cells, the difference in packet delay and transmission reliability may be significantly increased over legacy network architecture. Means to assure QoS, especially setting a maximum delay and residual error rate, are required.

Known latency measurements based on probe packets or added timing information are biased by differences in packet size, compression rate, modulation, switching path, throughput of network elements, and more between packets of actual payload and probe packets or injected additional data to payload packets. Measurements performed on unaltered payload would be more accurate and meaningful. This is true especially for the comparison of two or more potential communication paths.

U.S. Pat. No. 9,516,524 B2 describes a method for transmitter assisted QoS measurement. Time information is generated by the transmitter and transmitted along with a data transmission. A receiving device determines a QoS measurement based upon the time information and the received data. The time information indicates when the data was made available for transmission, which data transmission blocks belong to a single data transmission, and when a transmitter buffer was emptied. The QOS measurements are performance measurements such as, latency measurements and throughput measurements.

U.S. Pat. No. 9,191,269 B2 describes the provision of latency measurements for a communication path of a transmission network. Measurement of latency associated with one or more communication paths of a transmission network is initiated. An increase in the latency within the transmission network is detected based on the latency measurement. One or more secondary communication paths of the transmission network are determined to address the latency increase. One of the secondary communication paths is selected according to a latency threshold.

US 2018/0098250 A1, which was published after the date of conception of the present application, describes a technique whereby a mobile device maintains a data connection to a plurality of base stations and thereby redundant data links, the object of which is to provide seamless handover and reliable communication. No latency measurements are performed.

The known prior art is silent about any latency optimization for ultra-reliable services. Especially the combination of latency optimization with packet duplication for transmission with increased reliability is not known. The present invention describes respective techniques optimized for a 3GPP LTE, new radio (NR) or a combined LTE/NR system.

The present invention provides a method of selecting an optimal communication routing between a user equipment, UE, device and a core network wherein a plurality of differing communication paths are establishable between the UE device and the core network, the method comprising determining at a first one of the UE device and a core network entity that a communication path latency measurement shall be performed and informing the other one of the UE device and the core network that the communication path latency measurement will be performed; establishing at least a second communication path between the UE device and the core network if not previously established; transmitting over at least the first communication path and the second communication path duplicate data packets; determining from the data packets received over the first and the second communication path a latency difference measurement between transmission over the first communication path and the second communication path; and using the latency difference measurement choosing the communication routing from the first communication path and the second communication path for subsequent communication.

An aspect of the present invention is the use of duplicated packets for the measurement of latency difference of two or more communication paths. In order to optimize the communication path, packet duplication along two significantly different paths is used, e.g. in dual connectivity mode.

In order to perform a latency measurement, the receiver, e.g. in the PDCP layer, starts a timer for a new packet received in packet duplication mode. At the arrival of the same, redundant packet, the corresponding timer is stopped. The time between arrival of the first packet and the redundant second packet is the latency difference between the two packets. This method is not requiring any additional data in the packets, i.e. no timing information and no flag that marks the packet to be considered for the measurement. All required data are already contained in each packet. E.g. the PDCP sequence number could be used to identify same packets and the timing is derived from the different reception instances. Therefore, the method is beneficial as it saves radio resources. The timer cannot be used for absolute latency measurements, but for differential latency measurements of two different paths along which a packet has been sent. Therefore, the proposed method allows to determine the latency benefit or penalty of the paths chosen for sending the packet with the accuracy of the packet timer.

The packet duplication is a means to increase packet reception reliability known from prior-art and not generally changed with this invention. However, for services requiring reliable transport with low or limited latency, according to this invention, the transmission paths to be used are selected from the available paths taking the differential latency measurements into account. This prevents unnecessary redundant transmission in cases where available paths increase latency significantly and it allows path switching in cases where available different paths offer lower latency. The invention also allows to perform continued redundant transmission if the used two or more paths offer respective latencies within a defined latency interval. The invention is especially useful to reduce jitter (latency variation) if one or more of the paths has a high jitter and a redundant transmission increases the likelihood of a packet reception within the required latency interval.

The packet duplication may be turned on and off by the transmitting entity either autonomously or triggered by the receiver entity or a controlling entity.

The start of the packet duplication may be triggered by a reliability measurement, e.g. a packet error rate, or a latency measurement of the currently used path that exceed a threshold. The start of the packet duplication may alternatively be triggered by determination of communication link parameters by lower layers, e.g. a link quality measure. Another alternative is triggering packet duplication start from higher layer quality measurements, e.g. a packet error rate or the like. The start of the packet duplication may also be triggered periodically to determine potential reliability and latency benefits an alternative path offers. Packet duplication may also be the default use case of a communication system or a communication session and the present invention is used to trigger the suspension of the packet duplication based on latency difference measurements in a receiver.

The packet duplication may be performed at least long enough to allow for meaningful latency measurements. An averaging of a number of measurements may be performed to eliminate extraordinary single packet delays and enable the receiving entity to assess and compare the latency introduced by the involved paths.

The differential latency measurements may lead to one of the following adaption of the communication path, depending on the measured values and the latency and reliability requirements of the respective service:

If the latency difference between two paths exceeds a pre-determined threshold, the path with the lower latency is kept as the only communication path and the other path is (temporarily) terminated. This is especially useful in cases where the latency of one path constantly delays the respective packets beyond an acceptable value so that packets received have an overall delay above the service limits.

If the sign of the latency difference significantly deviates over time, i.e. each communication path contributes a significant number of first arriving redundant packets, both paths are kept, and packet duplication continues. In this case, jitter, overall packet delay and the rate of packets arriving within the overall packet delay budget are optimized.

If the latency difference is below a pre-determined threshold and the service requires packet error rates that may not be met by a single path transmission, both paths are kept, and packet duplication continues.

The latency difference measurements may be provided by the receiving entity to the transmitting entity via PDCP peer-to-peer communication or via a controlling entity, e.g. the radio resource control, RRC, protocol. Alternatively, the measurements are evaluated in the receiving entity and an execution of the resulting path selection and optimization is triggered via the PDCP or RRC protocol to the transmitting entity.

Preferred embodiments of the invention will now be described, by way of example only, with reference to the accompanying drawings in which.

The following describes embodiments of the invention optimized for a 3GPP communication system, e.g. LTE and/or New Radio (NR). This invention uses peer PDCP layer entities as the protocol stack entities in the end user device (user equipment, UE) and an entity of the network (e.g. BS, eNB, or gNB), respectively, between which user data is exchanged. Below each instance of a PDCP layer in the UE and NW, multiple paths may be available and selected (c.f. FIG. 1). The description of the techniques in the PDCP layer and below does not preclude the usage of the idea in other protocol layers or entities of a communication network.

3GPP for example currently specifies for the 5G core network in an activity named "access traffic steering, switching and splitting (ATSSS)" functionalities of the 3GPP network to decide for available 3GPP and non-3GPP paths, where to send data arriving. The current alternatives include initial selection, change and parallel usage of the 3GPP and non-3GPP for a data session, but they do not include redundant transmission of single packets. The current invention can be deployed in the ATSSS framework by applying the steps in the UE and the user plane function (UPF) of the 5G core network, potentially using a newly defined traffic flow control protocol (TFCP) between UE and UPF.

Packet duplication can be activated periodically, by PDCP analyzing received data packets or as a result of reporting absolute values or events by other layers. For example, the MAC layer may report the packet re-transmission rate. The current retransmission rate may be reported by MAC layer regularly or based on predefined events like exceeding one or more determined thresholds. Also, events related to error rates in PHY, IP, or TCP layer could trigger packet duplication. Activation of packet duplication could be based even on decreased QoS level or time-out errors in application level. The events could be reported directly to PDCP or to RRC, since RRC is connected to PDCP, RLC, MAC, and PHY layers.

Figure 2:
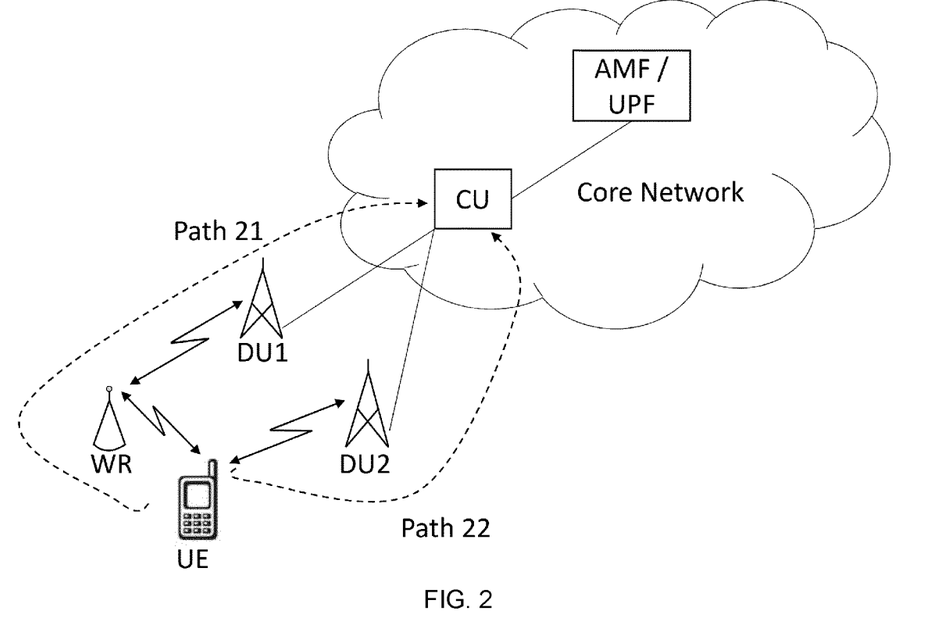
FIG. 2 shows a schematic first connection scenario.

A first situation, illustrated in FIG. 2 shows a distributed gNB and wireless relay for multi-path uplink transmission.

The scenario according to FIG. 2 is assumed in which base stations (gNBs) are separated into central unit (CU) and distributed unit (DU), both together forming the full functionality of a usual gNB. Multiple CUs for different DUs are combined into one entity named CU. In this embodiment CU1 is the central unit of gNB1. The distributed unit comprises all functionalities needed near the antenna, i.e. physical layer, MAC and RLC, whereas the CU comprises the control plane (RRC) and upper user plane (PDCP) layers. This separation is a well-known radio access network variant that is most beneficial for virtualization of the CU in bigger a performant central server and local deployment of DUs near the antenna or relayed access. In this distributed radio access network architecture, the CU can be considered to "near the core network", i.e. an edge part of the CN, while the DU is the actual radio access network.

A UE is connected in parallel via a wireless relay (WR), via DU1 to CU1 and finally to the core network and directly (without a wireless relay) via DU2 and CU2 to the core network. The wireless relay (WR) is connected wirelessly (i.e. using a wireless backhaul link) to DU1 and CU1. This example considers uplink transmissions.

The two uplink paths have different radio propagation properties due to the different locations of the WR and the CUs and will have different transmission latency due to the different radio links and the different number of entities involved in the transmission. In this example, the CU1 is considered to control the packet duplication function. The differential latency measurement is implemented in PDCP in CU1.

Figure 3:
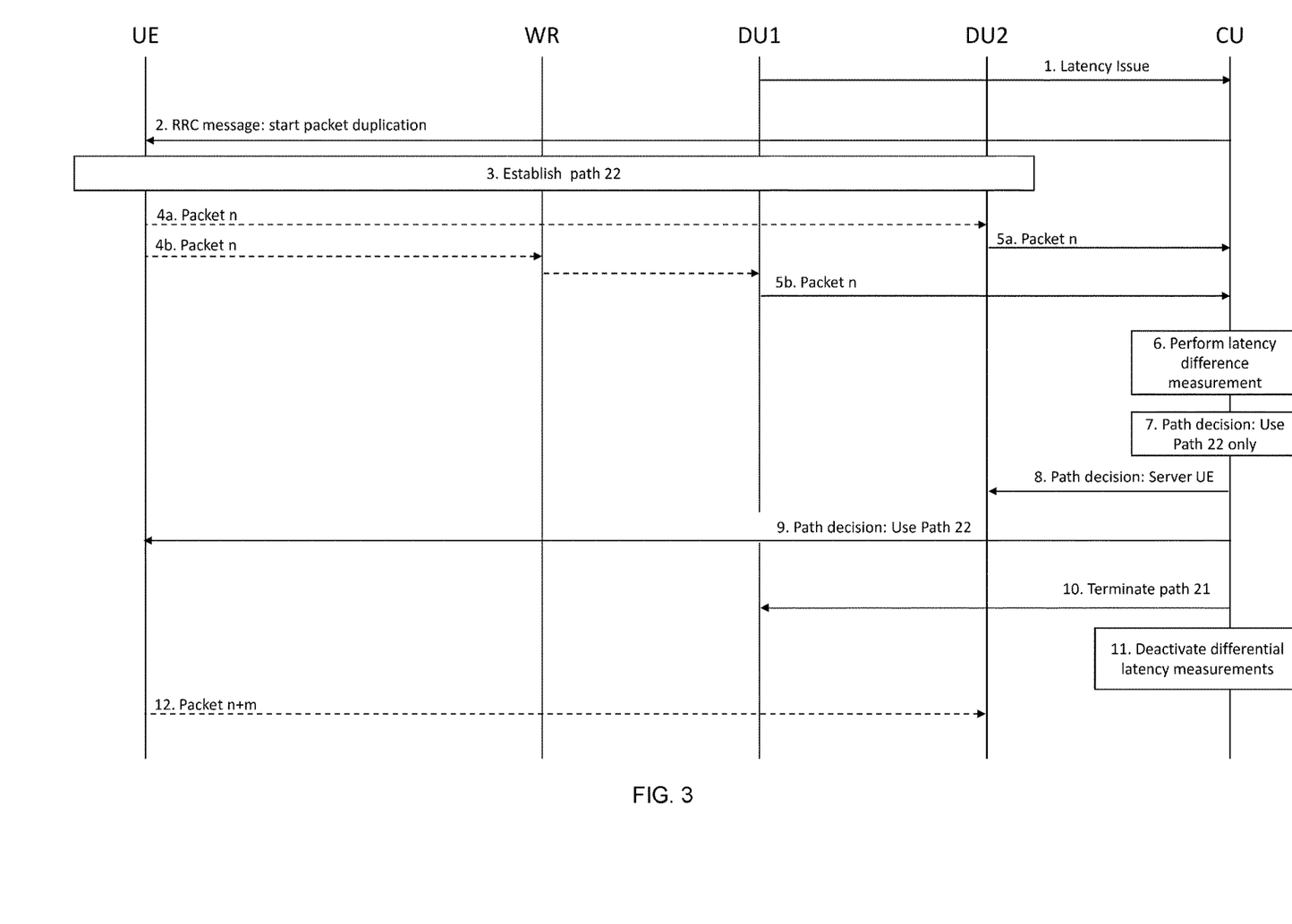
FIG. 3 is a message sequence chart of a first embodiment of the invention.

An example of a message flow is depicted in FIG. 3 and described in the following, with the numbering corresponding to the steps and messages in the figure:

0. The UE has an ongoing uplink connection with delay sensitive data. Two data paths are configured to be usable by the UE. Path 21 via a WR and path 22 via DU2 of gNB2. The data transmitted along the different paths are aggregated in the CU which is near or collocated with the core network, e.g. both are virtual entities in a server farm of the operator network. Currently only path 21 is used, as this was up to now the most efficient path.

1. The RRC layer of CU1 is now receiving information about a latency issue regarding the uplink transmission. In this example DU1 which serves the current uplink connection via the WR has sent a latency alert to the related RRC instance in CU1, e.g. as a result of buffer status measurements in MAC indicating a high and increasing uplink buffer in the UE.

2. CU1 decides to activate packet duplication and latency difference measurements to handle the latency issues. Therefore, it transmits an RRC message that starts the packet duplication in the UE and enables latency difference measurements in the CU (PDCP layers in CU1 and CU2) to the peer RRC entity in the UE.

3. As a result of the trigger message a second communication path between the UE and the network is established.

4. The RRC message in step 2 will trigger the UE to start packet duplication to both paths. The UE transmits duplicated packet n via path 21 (step 4a) and path 22 (step 4b). As a result, the CU can monitor the reception time of the received duplicated packets.

5. The redundant packets (step 5a and 5b) are transmitted to the common CU.

6. The CU derives the latency difference from the redundant packets. Steps 4 and 5 are repeated with new packets until a reliably latency difference value is derived by considering multiple measured values (e.g. averaging).

7. The CU determines that the latency of path 22 is much shorter than that of path 20. Therefore, it decides to use path 22 and terminate path 21.

8. The CU configures DU2 to take the primary reception role for uplink transmission.

9. The RRC entity of CU indicates to the peer entity in the UE to use path 22 for uplink transmissions and to terminate path 20. The UE terminates path 21. The termination preferably comprises sending all packets pending in buffers so that the path switch does not cause any packet losses.

10. The CU indicates to DU1 to terminate path 21.

11. CU1 terminates the packet timing monitoring.

12. The UE continues packet transmission on path 22.

Figure 4:
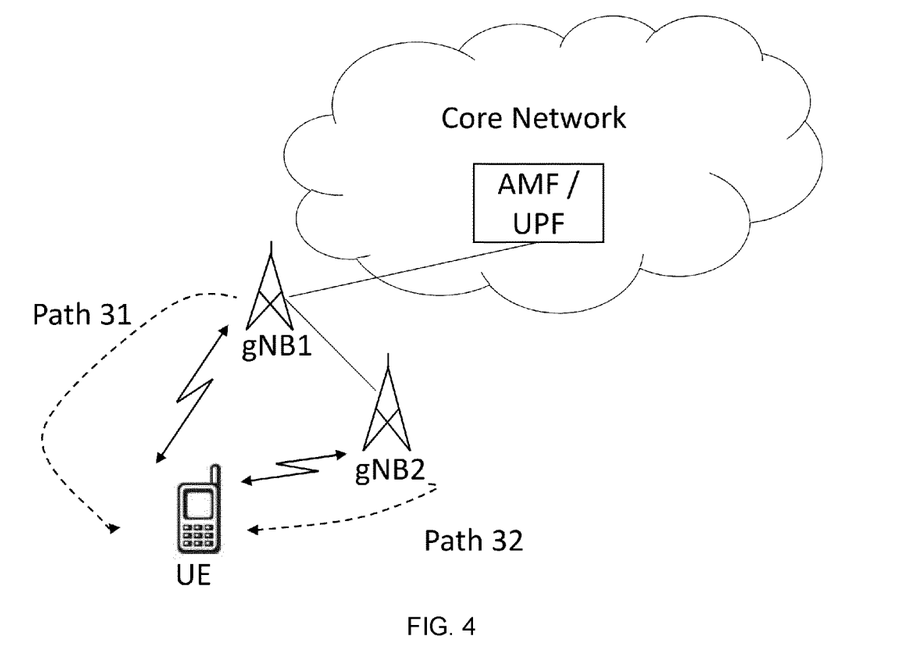
FIG. 4 shows a schematic second connection scenario.

A second situation is illustrated in FIG. 4. This shows a gNB and a WiFi access point for multi-path downlink transmission and dual connectivity.

In the example according to FIG. 4 the following scenario is assumed. A UE is connected in parallel via gNB1 and gNB2 with the core network. This example considers downlink transmissions. The two downlink paths, path 31 and path 32 have different radio propagation properties due to the different locations of the gNBs and will have different transmission latency. The differential latency measurement is performed by PDCP layer in the UE.

Figure 5:
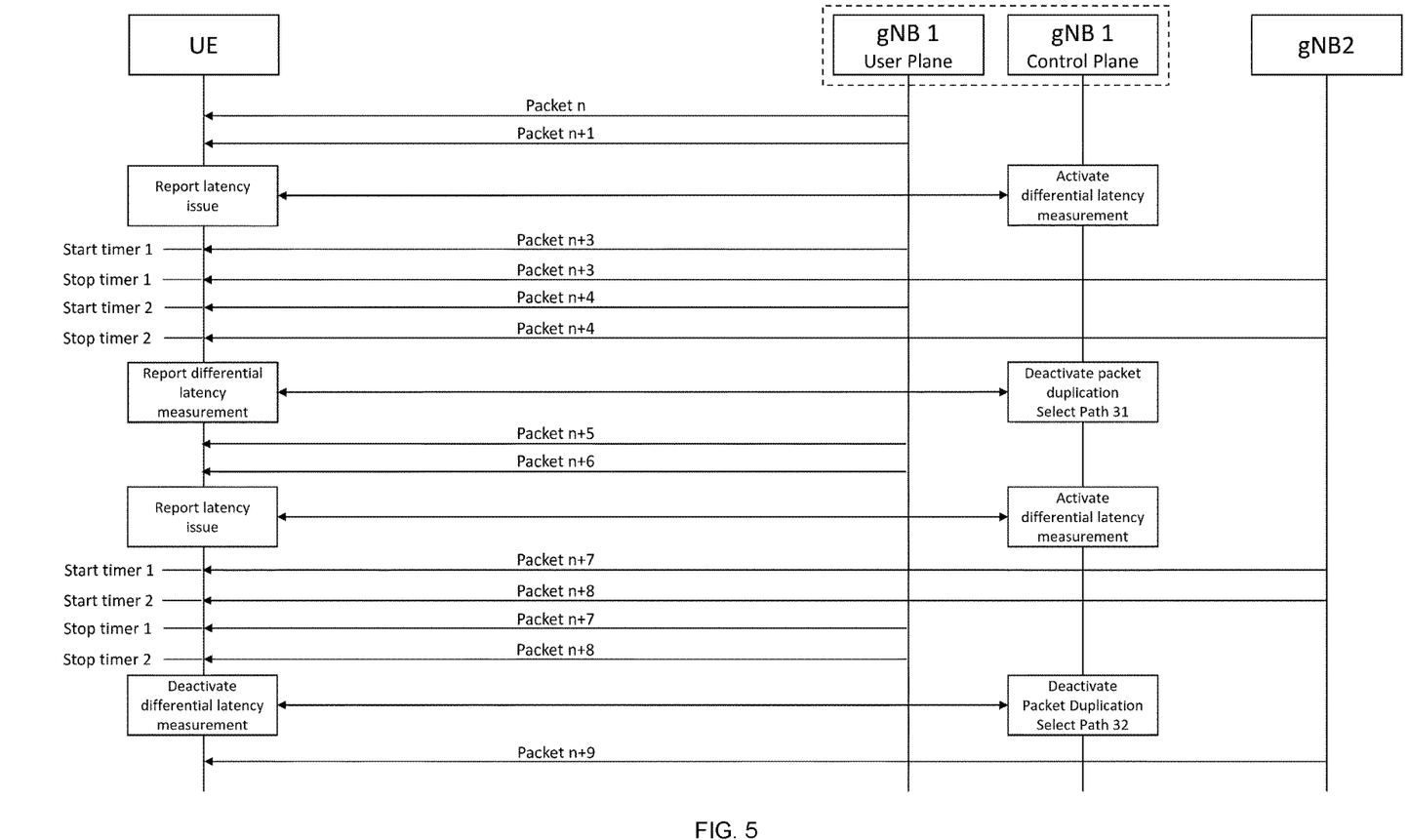
FIG. 5 is a message sequence chart of a second embodiment of the invention.

The corresponding message flow is depicted in FIG. 5. The message flow contains the messages between UE and gNBs. The messages between both involved gNBs are not depicted on purpose. The MSC is described in the following:

40. The UE has an ongoing downlink connection from gNB1 with delay sensitive data.

41. The RRC layer of the UE reports a latency issue regarding the downlink transmission. In this example the MAC layer in the UE which uses the current downlink connection has provided retransmission ratio information to the related peer RRC instance in gNB1 which indicates an average ratio of packets that require retransmission before successfully received and thus cause latency to the packet flow.

42. The UE may provide measurements to the gNB1 that enable the gNB1 to decide on the initiation of the packet duplication and that activate differential latency measurements in the UE. Alternatively, the UE requests a second path probe or second path usage from the gNB1. In both alternatives, according to the invention, gNB1 decides to perform packet duplication. The gNB1 transmits the RRC message "start latency difference measurements" to the peer RRC entity in UE to initiate the measurements in the PDCP layer in order to decide whether the latency issues caused by frequent re-transmissions in MAC layer can be overcome by usage of another transmission path. The RRC message may alternatively have the main function to trigger the UE to enable redundant reception of packets while the execution of latency measurements is triggered by the message only as a side effect.

43. The gNB1 establishes a second communication path via gNB2 to the UE. gNB1 acts as master cell and gNB2 as secondary cell. Both gNBs are connected directly via Xn interface. In this embodiment dual connectivity mode is used as packet duplication function. The packet duplication is performed in the PDCP layer of gNB1. The packets between gNB1 and gNB2 are transported via the Xn interface. Since Xn is a wired direct link between two gNBs the additional latency between gNB1 and gNB2 can be neglected. Duplicated packet n+3 and packet n+4 are transmitted via path 31 and path 32 to the UE.

44. The PDCP entity in the receiving UE will start timer1 with the reception of packet n+3 from gNB1 and stop timer1 with the reception of redundant packet n+3 from gNB2.

45. The PDCP layer derives the latency difference from the reception timings of packets n+3 and packets n+4. The latency difference is reported to the RRC layer in the master cell (gNB1). This can be done via absolute values (e.g. path 31 is 5 ms faster than path 32) or via threshold-based reporting (e.g. "no significant differential latency"). Since there is no significant latency difference between the two paths at this point in this example, RRC in gNB1 sends a "stop latency difference measurements" message to the peer RRC entity in the UE and stops the packet duplication in the downlink. Again, alternatively the RRC indicates a stop of redundant packet transmission which results in a stop of latency measurements in the UE.

46. Packets n+5 and packet n+6 are not duplicated anymore and transmitted only via path 31 from gNB1 to the UE.

47. The RRC layer of the UE is now receiving information from the application about a latency issue regarding the downlink transmission and is reporting the latency issue to the peer RRC layer in gNB1.

48. As a result, gNB1 decides to activate packet duplication and differential latency measurements again to handle the latency issues. Therefore, it transmits the second RRC message "start latency difference measurements" to the peer RRC entity in the UE and activates packet duplication with gNB2 as second communication path.

49. Redundant packet n+7 and packet n+8 are transmitted via path 31 and path 32 to the UE.

50. The PDCP entity in the receiving UE will start timer1 with the reception of packet n+7 and timer2 with the reception of packet n+8 from gNB1 and stop timer1 with the reception of redundant packet n+7 and timer2 with the reception of redundant packet n+8 from gNB2.

51. The PDCP layer derives the latency difference from the reception timings of packets n+7 and packets n+8. The latency difference is reported to the RRC layer in the master cell. This can be done via absolute values (e.g. path 32 is 50 ms faster than path 31) or via threshold-based reporting (e.g. "path 32 has middle rate lower latency"). Since there is a significant latency difference between the two paths, RRC in gNB1 triggers a handover to gNB2.

Figure 6:
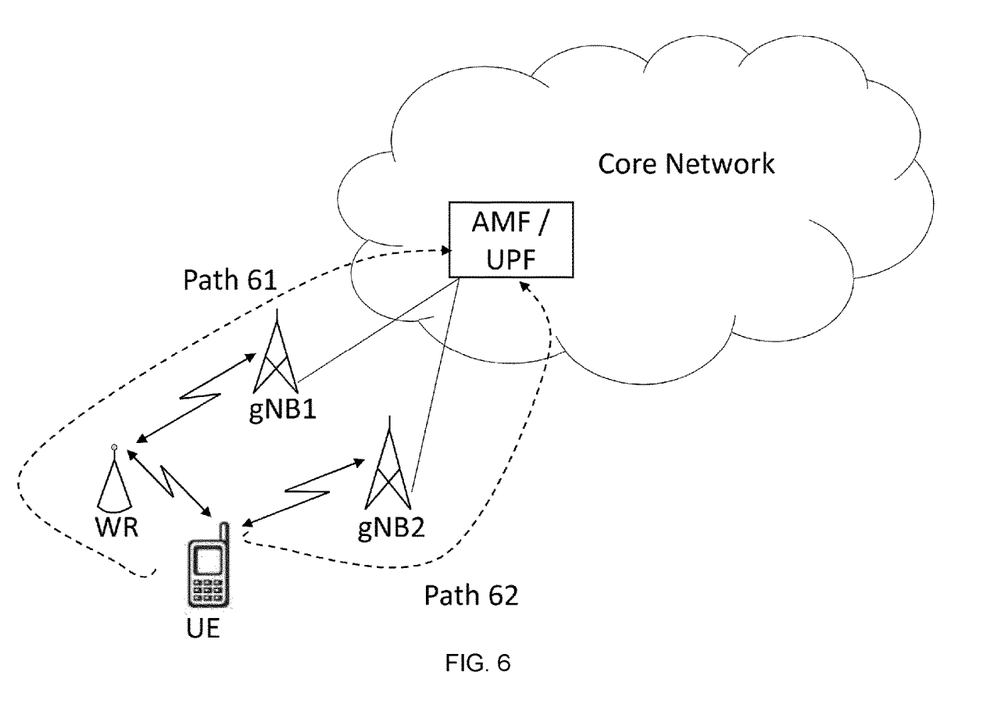
FIG. 6 shows a schematic third connection scenario.

FIG. 6 shows a third situation where a gNB and a wireless relay provide for multipath uplink transmission using a new layer.

In the scenario according to FIG. 6 a UE is connected via a wireless relay and in parallel via the gNB2 with the core network. The wireless router is connected wirelessly (i.e. using a wireless backhaul link) to gNB1, which is connected to the core network. This example considers uplink transmissions. The two uplink paths, path 61 and 62 have different radio propagation properties due to the different locations of the WR and the gNB and will have different transmission latency due to the different radio paths and the different number of entities involved in the transmission. In this embodiment, a new layer in the protocol stack of the user plane above PDCP layer and below IP layer controls a packet duplication function and performs differential latency measurements. This new core network functionality is named packet duplication function (PDF). It may be collocated with the UPF.

Figure 7:
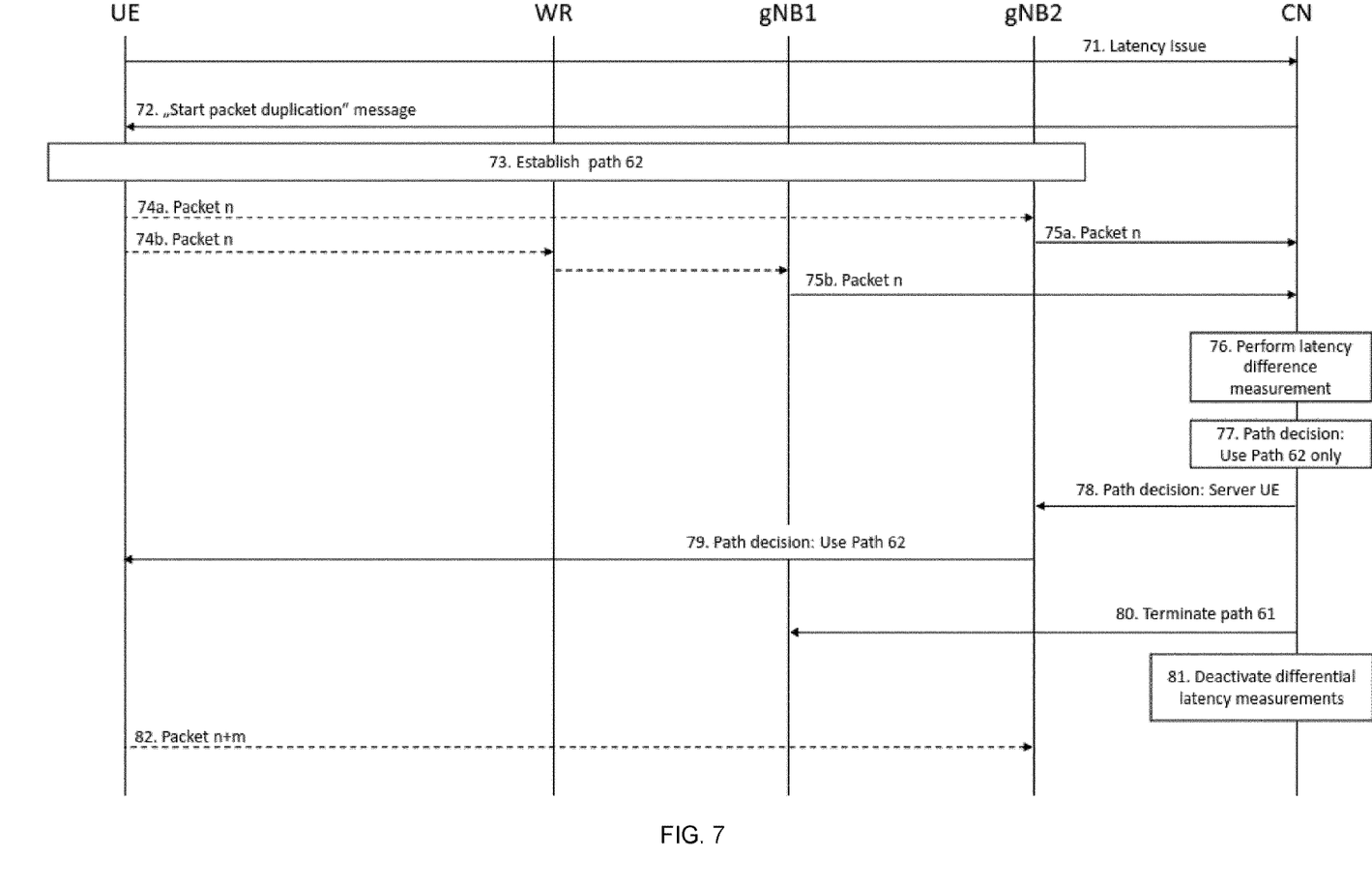
FIG. 7 is a message sequence chart of a third embodiment of the invention.

The corresponding message flow is depicted in FIG. 7 and described in the following:

70. The UE has an ongoing uplink connection with delay sensitive data. Two data paths are configured to be usable by the UE; a path 61 via a WR/gNB1 and a path 62 via gNB2. The data of the different paths are aggregated in the PDF in the core network. Currently only path 61 is used, as this was up to now the most efficient path.

71. The RRC layer of gNB1 is now receiving information about a latency issue regarding the uplink transmission. In this example RRC in gNB1 which serves the current uplink connection via the WR has received a latency alert sent by MAC layer of UE, e.g. as a result of buffer status measurements in MAC indicating a high and increasing uplink buffer in the UE. gNB1 is reporting the latency issue to an entity in the core network (CN), e.g. the AMF or SMF which controls the impacted data flow (PDU Session).

72. The entity in the core network decides to activate packet duplication and latency difference measurements to handle the latency issues. Therefore, it transmits a message to the UE that starts the packet duplication in the UE in PDF layer and activates latency difference measurements in the PDF layer of the UPF in the core network.

73. As a result of the trigger message the second communication path between the UE and the network that is already configured according to step 70 is established. This step may be an activation of radio transmission to gNB2. Alternatively, the radio transmission to gNB2 is already established for some PDU Sessions and this step comprises activation of redundant transmission for one or more additional PDU Sessions that have been using the path via WR/gNB1.

74. The message in step 72 will trigger the PDF layer in the UE to start packet duplication to both paths. The UE transmits duplicated packet n via path 71 (step 74a) and path 72 (step 74b). As a result, the PDF can monitor the reception time of the received duplicated packets.

75. The redundant packets (step 75a and 75b) are transmitted to the PDF in the CN, e.g. in the user plane function (UPF).

76. The PDF derives the latency difference from the redundant packets. Steps 74 and 75 are repeated with new packets until a reliably latency difference value is derived by considering multiple measured values (e.g. averaging).

77. The PDF determines that the latency of path 62 is much shorter than that of path 61. Therefore, the entity in the core network decides to use path 62 and terminate path 61.

78. The CN (AMF or SMF) configures gNB2 to take the primary reception role for uplink transmission. This step may be a direct configuration of gNB2, a request to gNB1 to initiate a handover or path switch to gNB2 or a request to the UE to trigger its serving gNB1 to handover the connection. The latter alternative may comprise sending measurement results of the PDF to the UE, e.g. via SMF or AMF, which forwards the results to the gNB1 to allow the gNB1 to finally decide on a handover to gNB2.

79. The RRC entity of gNB1 or the AMF or SMF indicate to the peer entity in the UE to use path 62 for uplink transmissions and to terminate path 61, i.e. to handover, switch the path or similar procedure. The UE terminates path 61.

80. The CN indicates to gNB1 to terminate path 61.

81. PDF terminates the differential latency measurement.

82. The UE continues packet transmission on path 62. This step is preferably a result of a handover to gNB2, i.e. the RRC connection of the UE with the radio access network also moved to gNB2.

This embodiment is also beneficial for scenarios in which the two mentioned gNBs (gNB1 and gNB2) are of different radio access technology, e.g. gNB1 is a 5G New Radio base station (gNB) and gNB2 is an LTE base station (eNB). The Wireless Relay (WR) is not necessarily involved in the given examples, it is just mentioned here for completeness.

This embodiment would work not only with a 3GPP RAN but also with non-3GPP network access; e.g. WiFi/N3IWF. In this alternative, the connection above with either gNB1 or gNB would be replaced with a connection to the core network via a WLAN access network and a non-3GPP interworking function (N3IWF). As no handover mechanisms are available on RAN level, the PDF (probably co-located with the user plane function UPF of the core network) and the session management function (SMF) of the core network would establish redundant paths, finally decide on the path to take and inform the UE accordingly.

Figure 8:
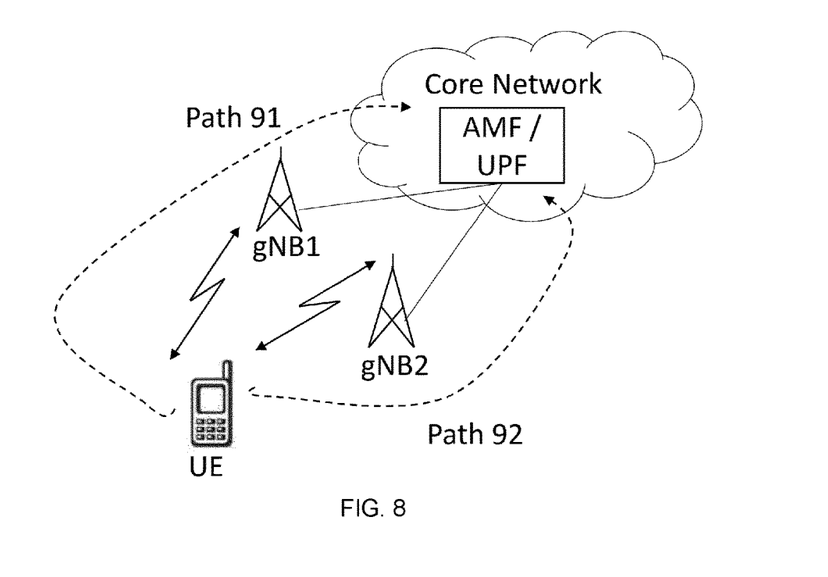
FIG. 8 shows a schematic fourth connection scenario.

In a fourth arrangement shown in FIG. 8, a gNB and a wireless relay provide for multi-path uplink transmission with absolute time reports via a UE.

In the embodiment according to FIG. 8 is UE is connected towards gNB1 and gNB2 with the core network. This example considers uplink transmissions. The two uplink paths, paths 91 and 92 have different radio propagation properties due to the different locations of the gNBs and will have different transmission latency. In this example, the differential latency measurement is based on time reports by PDCP layer in both gNBs. The UE controls the packet duplication function and performs the differential latency measurements on basis of the absolute timing reports from the gNBs. The differential latency measurement results are reported to the network in order to select a suitable communication path.

Figure 9:
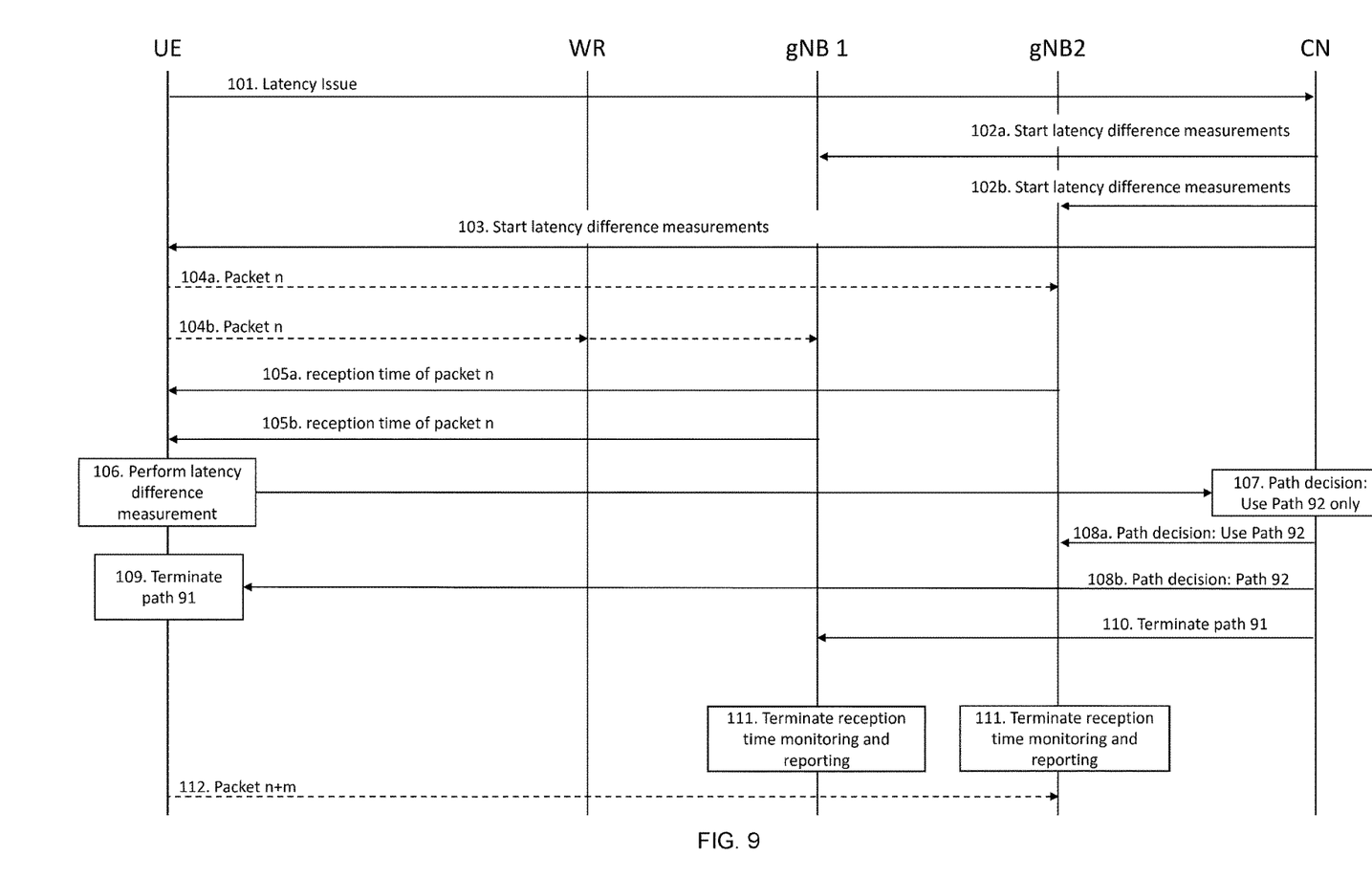
FIG. 9 is a message sequence chart of a fourth embodiment of the invention.

The corresponding message flow is depicted in FIG. 9 and described in the following:

100. The UE has an ongoing uplink connection with delay sensitive data. Two data paths are configured to be usable by the UE. Path 91 via a WR and path 92 via gNB2. The data of the different paths are aggregated in the UPF (user plane function). Currently only path 91 is used, as this was up to now the most efficient path.

101. The UE is now receiving information about a latency issue regarding the uplink transmission. In this example the application in the UE which uses the current uplink connection has send a latency alert, e.g. to the operating system or the related RRC instance. The UE reports the latency issue to the core network.

102. An entity in the core network decides to activate packet duplication and latency difference measurements to handle the latency issues. Therefore, it transmits a message "start latency difference measurements" to the gNB1 (step 102a) and the gNB2 (step 102b). This message will trigger the PDCP layers in the gNBs to monitor and report the reception time of the received packets to the UE.

103. The entity in the core network sends a message "start latency difference measurements" to the UE.

104. The UE activates packet duplication in the PDCP layer and transmits duplicated packet n via path 91 (step 104a) and path 92 (step 104b).

105. The receiving PDCP layers will report the reception time of packet n to the UE.

106. The UE derives the latency difference from the reported reception timings. Steps 104 and 105 are repeated with new packets until a reliable latency difference value is derived by considering multiple measured values (e.g. averaging). The differential latency measurement results are reported to the entity in the core network.

107. The entity in the core network determines, that the latency of path 92 is much shorter than that of path 91. Therefore, it decides to use path 92 and terminate path 91.

108. The entity in the core network indicates in 108a to gNB2 to take over the uplink transmission. The entity in the core network indicates in 108b to UE to use path 92 as communication path.

109. The UE stops packet duplication and uses path 92 as communication path only.

110. The entity in the core network indicates to gNB1 to terminate the communication path 91.

111. The monitoring and reporting of the reception timing is stopped as result of the received message.

112. The UE continues packet transmission on path 92.

The comments of the previous examples relating to gNBs of different radio access technologies and non-3GPP access apply to this example as well.

In summary, the present invention provides the following aspects:

New differential latency measurement for existing redundant transmission methods:

- PDCP enhancements: Latency measurements can be activated e.g. in PDCP layer. A timer is started after a certain data packet was successfully received and stopped, when the identical packet arrives in PDCP layer via different MAC layer or different physical resources. The derived time duration is the desired latency difference of the redundant data packets. The timer is obviously also stopped when it exceeds a maximum wait-time. The PDCP layer is informed about the MAC layer or physical transmission resources over which a packet is received.
- The latency difference of redundant packets may be further processed to eliminate the special nature of single packet transmissions, e.g. it is averaged over a time interval, the maximum and/or minimum values are eliminated before averaging and/or the delay of erroneously received packets is eliminated from processing.
- If the resulting latency difference between redundant packets exceeds a threshold, PDCP in the receiver reports the path, i.e. the MAC or PHY layer, over which the packets have arrived first, to be the more suited communication path. Alternatively, the measuring entity provides the measured differential latency values to the network. For the downlink scenario the measurement is performed by the UE and therefore the provisioning can be transported via the PDCP protocol, RRC protocol, or other protocols. For the uplink scenarios the measurement is performed in the network and measurements results are provided to a decision entity in the network.

If the resulting latency difference between redundant packets is below a predefined threshold, PDCP in the receiver reports both paths to be suited for transmission of data. As a result, both paths may be continuously used to transmit redundant packets.

If the latency difference does not result clearly in a single path to have lower delay, PDCP in the receiver reports both paths to be suited and the usage of both path to reduce overall latency significantly. As a result, again, both paths may be continuously used to transmit redundant packets.

The reporting for a decision which transmission path to keep alive can go directly to the sender, e.g. via the RRC protocol. Alternatively, the receiver may decide which transmission path to keep alive (either or both of the measured paths) and report the decision to the sender via PDCP peer-to-peer signaling or via the RRC protocol.

A redundant transmission is triggered if one or more of the following events occur:
Latency exceeds a given threshold
Jitter exceeds a given threshold
re-transmission rate exceeds a given threshold
data throughput is declining
error rate is increasing
notification from higher layers that current communication path is not sufficient for QoS assurance Redundancy is switched off again, if one or more of the following events occur:
After a determined time period
Selection of communication path with higher QoS level is finished
Latency has been significantly decreased
QoS has been significantly increased (reported by higher layer)
Data throughput has been increased
Error Rate has been significantly decreased
Re-transmissions have been significantly reduced
Communication paths are not significant different to each other
Quality of one communication path decreases over the other The invention allows the selection of a currently optimal transmission path according to given latency requirements. It provides means for an accurate comparison of the latency introduced by different communication paths while using packet duplication (and the respective radio resources) only as long as required for the measurements or as long as beneficial and efficient for data transmission with respect to reliability and latency. The invention includes periodic, permanent and event driven triggering of the packet duplication and latency difference measurements and it includes a path and redundancy level selection combined with a respective stop of the measurements.

It is beneficial to use the unchanged actual payload data for latency measurements. In prior-art, additional information, like e.g. timing information, is added to the actual payload or special probe data is injected into the payload data stream. Therefore, the measurements become distorted, since actual packet size or number/frequency of packets are altered. Additional data for measurements lead to data overhead.

It is in the nature of redundant transmission to increases the availability and reliability of the communication. Therefore, usage of additional radio resources for redundant transmission for the purpose of QoS measurements is significant more accurate than existing methods of latency measurement and has the positive side-effect to increase the reliability of the connection.

What is claimed is:

1. A method of selecting an optimal communication routing between a user equipment, UE, device and a core network wherein a plurality of differing radio communication paths are establishable between the UE device and the core network, the method comprising:
   in a state where only a first radio communication path is established between the UE device and the core network, determining at a first one of the UE device and a core network entity that a communication path latency measurement shall be performed and informing the other one of the UE device and the core network entity that the communication path latency measurement will be performed;
   establishing at least a second radio communication path between the UE device and the core network;
   transmitting over at least the first radio communication path and the second radio communication path duplicate data packets;
   determining from the data packets received over the first and the second radio communication paths a latency difference measurement between transmission over the first radio communication path and the second radio communication path;
   using the latency difference measurement choosing the radio communication routing from the first radio communication path and the second radio communication path for subsequent communication.

2. The method according to claim 1, wherein the core network includes a central unit, CU, entity in radio communication with a first distributed unit (gNB1), DU, and a second DU (gNB2), and each DU forms in combination with the CU a base station.

3. The method according to claim 2, wherein the first DU on the first radio communication path detects a potential communication problem and informs the CU, the CU sends a radio resource control message to the UE device over the first radio communication path and after the second radio communication path via the second DU has been established the UE commences transmitting duplicate data packets over the first and second radio communication paths, thereby enabling the CU to perform the communication path latency measurement.

4. The method according to claim 3 wherein the communication path latency measurement is triggered by a reliability measurement or periodically.

5. The method according to claim 3, wherein if a measured latency difference between the first and the second radio communication paths exceeds a predetermined threshold, the radio communication path with the lower latency measurement is maintained as the only radio communication path.

6. The method according to claim 2, wherein the UE device detects a potential communication problem with the first radio communication path and informs the CU, the CU sends a radio resource control message to the UE device over the first radio communication path and after the second radio communication path via the second DU has been established the UE commences transmitting duplicate data packets over the first and second radio communication paths, thereby enabling the CU to perform the communication path latency measurement.

7. The method according to claim 6 wherein the communication path latency measurement is triggered by a reliability measurement or periodically.

8. The method according to claim 6, wherein if a measured latency difference between the first and the second radio communication paths exceeds a predetermined threshold, the radio communication path with the lower latency measurement is maintained as the only radio communication path.

9. The method according to claim 2, wherein the UE device detects a potential communication problem with the first radio communication path and informs the CU, the CU instructs the UE device, and the first and second DUs to commence communication path latency measurements and after the second communication path via the second DU has been established duplicate data packets are transmitted via the first and second radio communication paths to the UE device which performs the communication path latency measurement and results of the measurement are transmitted to the core network.

10. The method according to claim 9 wherein the communication path latency measurement is triggered by a reliability measurement or periodically.

11. The method according to claim 9, wherein if a measured latency difference between the first and the second radio communication paths exceeds a predetermined threshold, the radio communication path with the lower latency measurement is maintained as the only radio communication path.

12. The method according to claim 2 wherein the communication path latency measurement is triggered by a reliability measurement or periodically.

13. The method according to claim 2, wherein if a measured latency difference between the first and the second radio communication paths exceeds a predetermined threshold, the radio communication path with the lower latency measurement is maintained as the only radio communication path.

14. The method according to claim 2, wherein if a measured latency difference changes over time by more than a predetermined threshold, both the first and second radio communication paths are maintained and packet transmission is duplicated.

15. The method according to claim 2, wherein if a measured latency difference changes over time by less than a predetermined threshold and service requirements require a packet error rate not met by either radio communication path both the first and second radio communication paths are maintained and packet transmission is duplicated.

16. The method according to claim 1 wherein the communication path latency measurement is triggered by a reliability measurement or periodically.

17. The method according to claim 1, wherein if a measured latency difference between the first and the second radio communication paths exceeds a predetermined threshold, the radio communication path with the lower latency measurement is maintained as the only radio communication path.

18. The method according to claim 1, wherein if a measured latency difference changes over time by more than a predetermined threshold, both the first and second radio communication paths are maintained and packet transmission is duplicated.

19. The method according to claim 1, wherein if a measured latency difference changes over time by less than a predetermined threshold and service requirements require a packet error rate not met by either radio communication path both the first and second radio communication paths are maintained and packet transmission is duplicated.

20. The method according to claim 1, wherein one of the first and second radio communication paths is provided by a non-3GPP access network.

\* \* \* \* \*